(12) United States Patent
Galea

(10) Patent No.: US 7,702,156 B2
(45) Date of Patent: Apr. 20, 2010

(54) METHOD AND SYSTEM FOR THE DETECTION OF SHADOWS IN NOISY IMAGES

(75) Inventor: Christopher Galea, Zabbar (MT)

(73) Assignee: STMicroelectronics Ltd., Kirkop (MT)

( * ) Notice: Subject to any disclaimer, the term of this patent is extended or adjusted under 35 U.S.C. 154(b) by 1029 days.

(21) Appl. No.: 11/399,684

(22) Filed: Apr. 5, 2006

(65) Prior Publication Data

US 2006/0280369 A1    Dec. 14, 2006

(30) Foreign Application Priority Data

Apr. 5, 2005    (IT)    ............................ MI2005A0558

(51) Int. Cl.
*G06K 9/46*    (2006.01)
*G06K 9/34*    (2006.01)

(52) U.S. Cl. ...................................... 382/190; 382/173

(58) Field of Classification Search ....................... None
See application file for complete search history.

(56) References Cited

U.S. PATENT DOCUMENTS 6,360,009 B2 *    3/2002    Li et al. ...................... 382/176
7,397,935 B2 *    7/2008    Kimmel et al. ............. 382/128
7,437,013 B2 *    10/2008    Anderson ................... 382/261

* cited by examiner

*Primary Examiner*—Yuzhen Ge
(74) *Attorney, Agent, or Firm*—Lisa K. Jorgenson; Paul F. Rusyn; Graybeal Jackson LLP

(57) ABSTRACT

A method for the extraction of shadows in noisy images includes capture of an image, subdivision of the image into a plurality of pixels, definition of a square odd matrix for every pixel having said pixel in the center, application of an algorithm to the matrixes of every pixel, and displaying of an error map of the image. The algorithm is a contour algorithm that includes the operations of =computation of the averages for each corner of the matrix, computation of the averages for the top, bottom, left and right sides, computation of the maximum variance between these eight averages, and comparison with a present value (max variance).

20 Claims, 3 Drawing Sheets

METHOD AND SYSTEM FOR THE DETECTION OF SHADOWS IN NOISY IMAGES

PRIORITY CLAIM

The present application claims the benefit of Italian Application Serial No. MI2005A000558, filed Apr. 5, 2005, which application is incorporated herein by reference in its entirety.

TECHNICAL FIELD

Embodiments of the present invention relate to a method for the detection of shadows in noisy images.

BACKGROUND

After having captured a picture, the first step toward identifying shadows in the picture involves the exploitation of the luminance properties of shadow. Shadows result from the obstruction of light from a light source. Thus, the luminance values in a shadow region are smaller than those in the surrounding lit regions.

Currently detection of faint blobs and other shadowing problems is done using an algorithm called "shapes test". This test looks for shaded regions, and evaluates shaded areas by averaging different kernel sizes, where a kernel is the array surrounding the pixel being checked.

This test is efficient in detecting blobs; but can fail in detecting larger faint contours as shown by error maps, which are the results of the shape test algorithm, and which correspond to various captured pictures. To make the latter test more efficient, more rigid limits were set. This ensures detection of most of the rejects; however, it also amplifies noise and usually causes over-rejection.

SUMMARY

In view of the state of the art herein described, one embodiment of the present invention is to provide a method and system to detect faint blobs or other shadowing problems on a flat noisy image without the problems above mentioned.

According to another embodiment of the present invention, a method for the extraction of shadows in noisy images includes the capture of an image, subdivision of the image into a plurality of pixels, definition of a square odd matrix for every pixel having the pixel in the center, application of an algorithm to the matrixes of every pixel, and displaying of an error map of the image. The algorithm is a contour algorithm that includes the operations of computation of the averages for each corner of the matrix, computation of the averages for the top, bottom, left and right sides, computation of the maximum variance between these eight averages, and comparison with a present value.

BRIEF DESCRIPTION OF THE FIGURES

The characteristics and the advantages of the present invention will be made evident by the following detailed description of an embodiment thereof, which is illustrated as non-limiting example in the enclosed drawings, in which.

DETAILED DESCRIPTION

The following discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
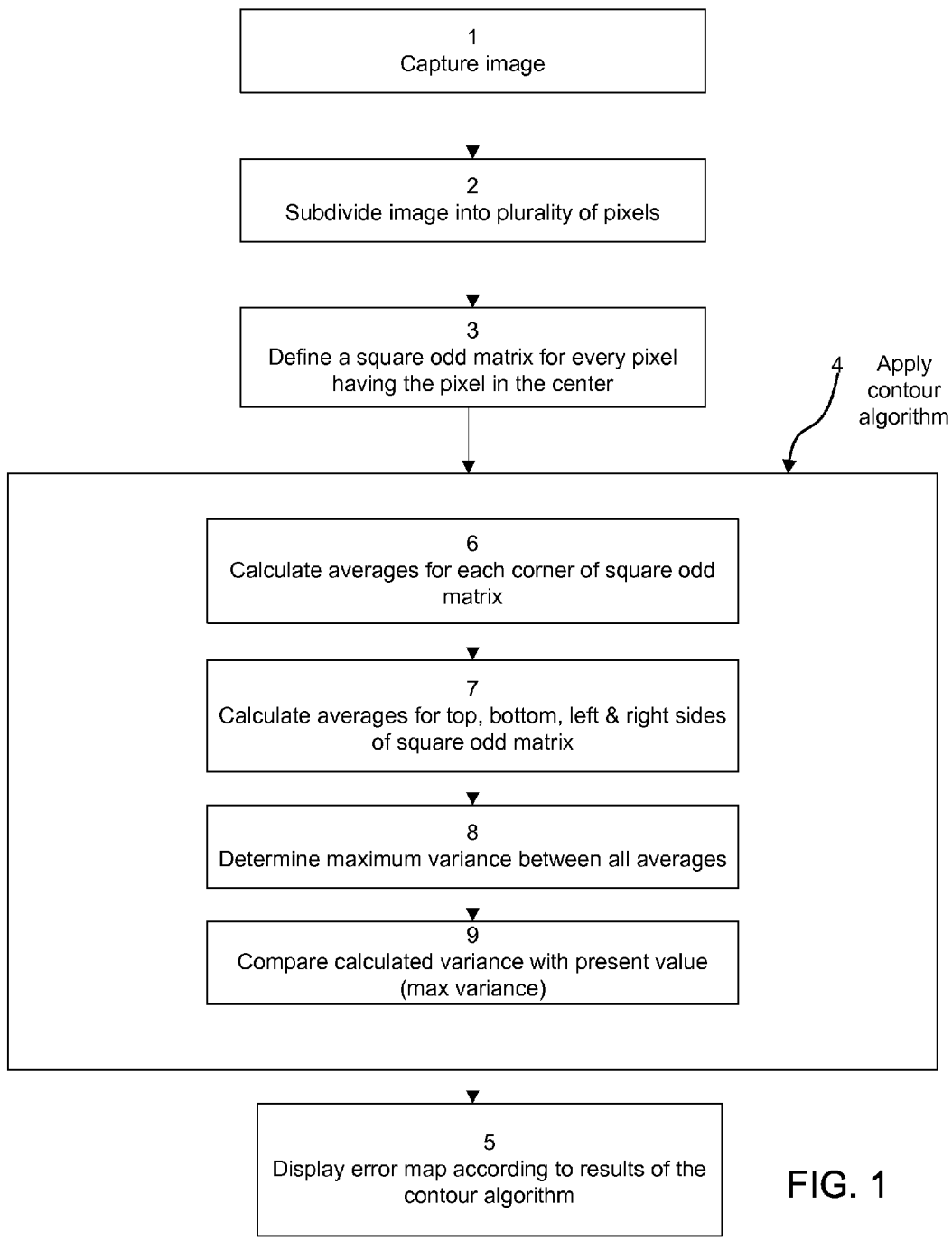
FIG. 1 shows a diagram illustrating the steps of a method according to one embodiment of the present invention.
Figure 2:
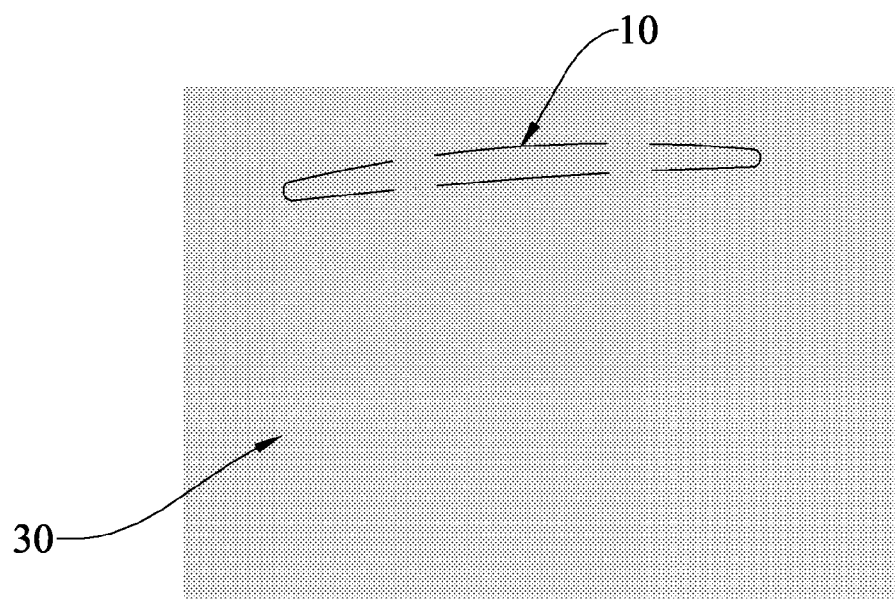
FIG. 2 shows a captured image with a faint large shadow.

A method according to one embodiment of the present invention includes the steps shown in FIG. 1. Step 1 is the capture of an image 30 as depicted in FIG. 2. Step 2 of this embodiment is subdivision of the image 30 into a plurality of pixels followed by step 3 which is definition of a square odd matrix for every pixel having the pixel in the center. Step 4 is an application of a contour algorithm. Step 5 is displaying of an error map according to the results of the contour algorithm.

The contour algorithm consists of various operations hereafter described on a captured image 30 shown in FIG. 2 with a faint large shadow 10. The error maps of FIGS. 3-6 show various failing blobs 12 and failing regions 13 according to the specific contour algorithm and variance adopted. The contour algorithm 4 includes the following steps. All of the explanation below considers a 7×7 kernel or matrix, that is an array surrounding the pixel being checked. The pixel under test is marked with an X:

```
*******
*******
*******
*X*     7 × 7 kernel
*******
*******
*******
```

The contour algorithm first calculates the averages for each corner as represented by step 6 in FIG. 1.

```
**      *X      X*      **
*A**      ****      ****      *D**
****      *B**      **C*      ****
***X      ****      ****      X***
```
A = (Sum of 15 surrounding pixels)/15;
B = (Sum of 15 surrounding pixels)/15;
C = (Sum of 15 surrounding pixels)/15;
D = (Sum of 15 surrounding pixels)/15;

Then the contour algorithm also works out the average for the top, bottom, left and right sides as represented by step 7 in FIG. 1.

```
*******                    X
*E*                    *******
*****                    *F***
X                          *******
E = (Sum of 21 surrounding pixels)/21
F = (Sum of 21 surrounding pixels)/21
***                        ***
***                        ***
***                        ***
*G*X                       X*H*
***                        ***
***                        ***
***                        ***
G = (Sum of 21 surrounding pixels)/21
H = (Sum of 21 surrounding pixels)/21
```

The contour algorithm works out in step 8 for each pixel the MAXIMUM variance between these eight averages. The variance for each pixel is calculated as follows: Variance (X)=Absolute (Max (A, B, C, D, E, F, G, H)−Min (A, B, C, D, E, F, G, H)).

Finally, in step 9 of the contour algorithm there is a comparison of the calculated Variance (X) with a present value (max variance). If the Variance (X) exceeds the preset value (max variance), that pixel X is taken as a fail.

As regards the analysis of the captured image 30 of FIG. 2, the image 30 is firstly divided in step 2 into a certain number of pixels (it depends on resolution).

Figure 3:
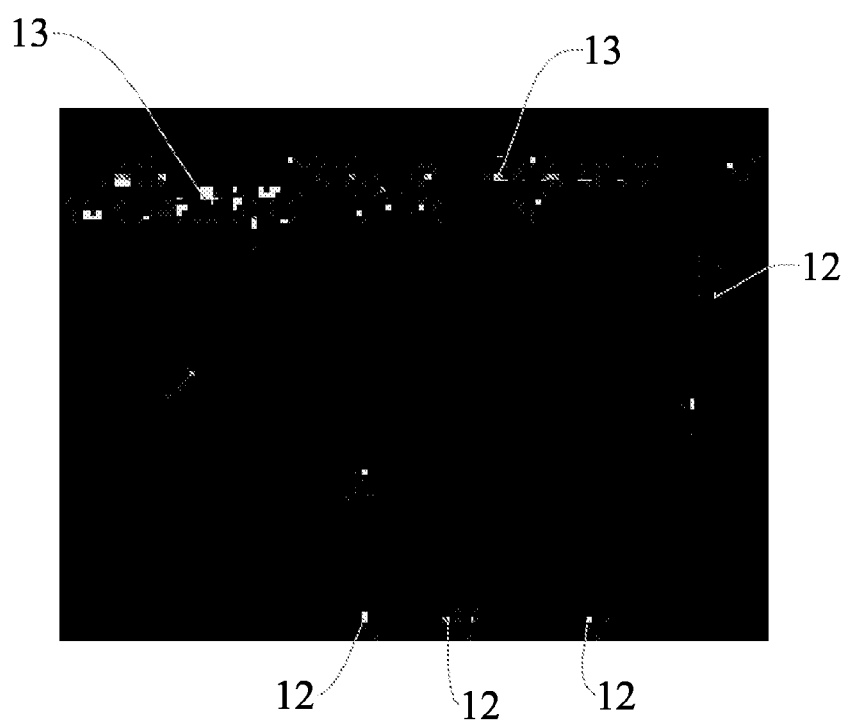
FIG. 3 shows an error map of the image of FIG. 1 using a 11×11 & 3×3 kernel shapes test with a variance of 0.99%.
Figure 4:
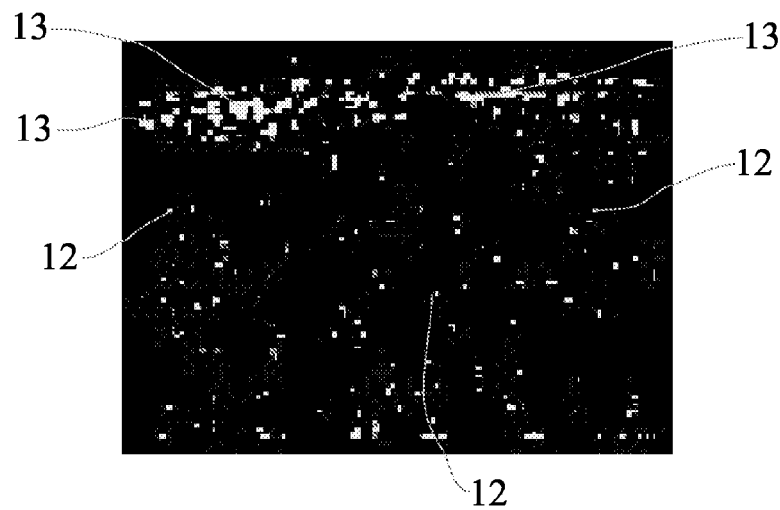
FIG. 4 shows an error map of the image of FIG. 1 using a 11×11 & 3×3 kernel shapes test with a variance of 0.69%.

By applying the 11×11 & 3×3 kernel test shapes with a variance of 0.99% for every pixel, the error map of FIG. 3, corresponding to the image of FIG. 2, shows very few failing regions 13. The failing regions 13 are separated from each other and all failing blobs 12 are extremely small.

Thus in order to screen out the above method using the shapes test, one must either set a smaller variance or else accept only very small shape sizes.

Reducing the largest shape size accepted will cause over-rejection devices having just two slightly darker pixels (almost impossible to notice) and can easily result in blobs larger than 10 units.

On the other hand, by reducing the accepted variance (FIG. 4), the largest failing blob 12 is much larger and easier to screen out. However, the error image is now full of failing blobs 12. This indicates that such limits increase the chance to have error blobs larger than the acceptable limit even on good units.

Concluding, the shapes test algorithm can screen faint blobs 12, but with a great probability of over rejection.

Figure 5:
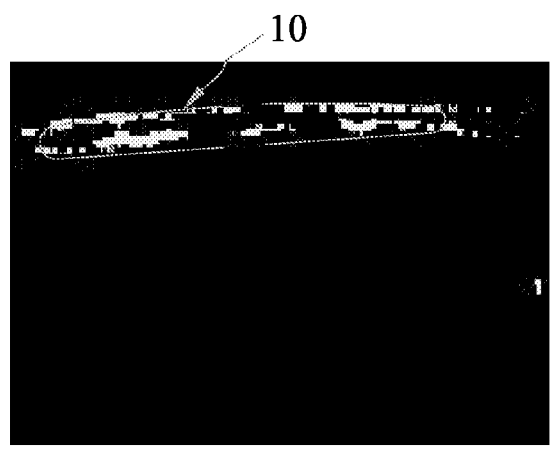
FIG. 5 shows an error map of the image of FIG. 1 using a 7×7 kernel contour algorithm with a variance of 1.50% of a method according to one embodiment of the present invention.

The contour algorithm looks for different shading values in all directions by comparing kernel averages around each pixel. Unlike the shapes test, FIG. 5 shows that the shape of the faint large shadow 10 is identified without extensively increasing the noise in the rest of the image.

Figure 6:
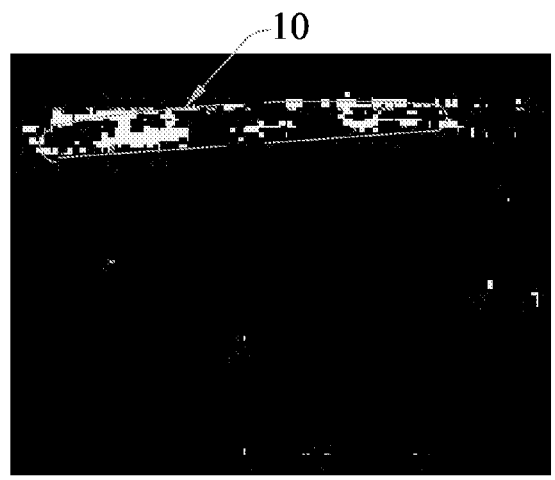
FIG. 6 shows an error map of the image of FIG. 1 using the 11×11 & 3×3 kernel shapes test with a variance of 0.99%, combined with the 7×7 kernel contour algorithm with a variance of 1.50% according to another embodiment of the present invention.

A mixture of both the standard shape test and contour test is most probably the best way to screen bad parts, without over-rejecting any good units. FIG. 6 shows the resultant error map.

The error map obtained by the shapes test combines some large contour error regions 13. This happens because the shapes test tends to detect the centre of the blob 12 while the contour test identifies the contour of the blob 12. Hence, frequently, the combined effect of the two algorithms results to be quite large and fairly easy to detect.

The method described above with reference to FIG. 1 may be implemented in a variety of different types of electronic circuitry, such as through suitable analog or digital circuitry. Moreover, such electronic circuitry may be contained in a wide variety of different types of electronic devices, such as digital cameras, cellular phones, and personal digital assistants (PDAs). Such an electronic device would also include circuitry to utilize the generated pass and fail operations for pixels in a captured image to adjust the displayed values of pixels in the image when the image is displayed on the device.

From the foregoing it will be appreciated that, although specific embodiments of the invention have been described herein for purposes of illustration, various modifications may be made without deviating from the spirit and scope of the invention.

The invention claimed is:

1. A method for the extraction of shadows in noisy images, comprising the following steps:
    capturing an image;
    subdividing the image into a plurality of pixels;
    defining a square odd matrix for every pixel having said pixel in the center;
    applying an algorithm using a device to the matrices;
    displaying an error map of said image;
    wherein the algorithm is a contour algorithm, comprising the follow steps:
        computing averages for each corner of the matrix;
        computing averages for the top, bottom, left and right sides;
        computing the maximum variance between these eight averages; and
        comparing the maximum variance with a present value.

2. The method according to claim 1, wherein the square odd matrix is a 7×7 kernel.

3. A method for the extraction of shadows in a captured image, the captured image including a plurality of pixels and also including noise, the method comprising:
    subdividing the image into a plurality of pixels;
    defining a square odd matrix for each pixel, each matrix having a value for the corresponding pixel in the center of the matrix and values for pixels surrounding the pixel in the center;
    applying a contour algorithm using a device to each of the defined matrices, the contour algorithm including:
        determining averages for the values of the pixels in the first, second, third, and fourth corners of each matrix;
        determining averages for the values of the pixels in the top, bottom, left and right sides of the matrix;
        determining a maximum variance from the first corner average, second corner average, third corner average, fourth corner average, top side average, bottom side average, left side average, and right side average; and
        determining whether the maximum variance is greater than a maximum preset variance value;
    designating for each pixel a fail operation when the maximum variance is determined to be greater than the maximum preset variance value; and
    designating for each pixel a pass operation when the maximum variance is determined to be less than the maximum preset variance value.

4. The method of claim 3 wherein the maximum preset variance value is 0.99%.

5. The method of claim 3 wherein the maximum present variance value is 0.69%.

6. The method of claim 3 wherein the square odd matrix comprises a 7×7 matrix.

7. The method of claim 6 wherein each of the first, second, third, and fourth corner averages equals the sum of values for the 15 surrounding pixels divided by 15.

8. The method of claim 7 wherein each of the top, bottom, left, and right side averages equals the sum of 21 values of surrounding pixels divided by 21.

9. The method of claim 3 wherein the square odd matrix comprises an 11×11 matrix.

10. The method of claim 3 wherein the method further comprises generating an error map of the image after applying the contour algorithm, the error map showing whether respective pixels in the image have a pass or fail operation associated with the pixel.

11. The method of claim 3 further comprising performing the shape test algorithm on the pixels in the image.

12. A method for the extraction of shadows in a captured image, the captured image including a plurality of pixels and also including noise, the method comprising:
subdividing the image into a plurality of pixels;
defining a square odd matrix for each pixel, each matrix having a value for the corresponding pixel in the center of the matrix and values for pixels surrounding the pixel in the center;
applying a contour algorithm using a device to each of the defined matrices, the contour algorithm including:
determining averages for the values of the pixels in the first, second, third, and fourth corners of each matrix;
determining averages for the values of the pixels in the top, bottom, left and right sides of the matrix;
determining a maximum variance from the first corner average, second corner average, third corner average, fourth corner average, top side average, bottom side average, left side average, and right side average; and
determining whether the maximum variance is greater than a maximum preset variance value;
designating for each pixel a fail operation when the maximum variance is determined to be greater than the maximum preset variance value;
designating for each pixel a pass operation when the maximum variance is determined to be less than the maximum preset variance value;
performing the shape test algorithm on the pixels in the image; and
generating an error map of the image from the pass and fail operations for each pixel generated by the contour algorithm and from the results of the shape test algorithm.

13. The method of claim 3 wherein the value of each pixel comprises a luminance value.

14. A circuit for extracting shadows in a captured image, the captured image including a plurality of pixels and also including noise, the circuit performing steps comprising:
subdividing the image into a plurality of pixels;
defining a square odd matrix for each pixel, each matrix having a value for the corresponding pixel in the center of the matrix and values for pixels surrounding the pixel in the center;
applying a contour algorithm to each of the defined matrices, the contour algorithm including:
determining averages for the values of the pixels in the first, second, third, and fourth corners of each matrix;
determining averages for the values of the pixels in the top, bottom, left and right sides of the matrix;
determining a maximum variance from the first corner average, second corner average, third corner average, fourth corner average, top side average, bottom side average, left side average, and right side average; and
determining whether the maximum variance is greater than a maximum preset variance value;
designating for each pixel a fail flag when the maximum variance is determined to be greater than the maximum preset variance value; and
designating for each pixel a pass flag when the maximum variance is determined to be less than the maximum preset variance value.

15. The circuit of claim 14 wherein the circuit comprises digital circuitry.

16. A circuit for extracting shadows in a captured image, the captured image including a plurality of pixels and also including noise, the circuit performing steps comprising:
subdividing the image into a plurality of pixels;
defining a square odd matrix for each pixel, each matrix having a value for the corresponding pixel in the center of the matrix and values for pixels surrounding the pixel in the center;
applying a contour algorithm to each of the defined matrices, the contour algorithm including:
determining averages for the values of the pixels in the first, second, third, and fourth corners of each matrix;
determining averages for the values of the pixels in the top, bottom, left and right sides of the matrix;
determining a maximum variance from the first corner average, second corner average, third corner average, fourth corner average, top side average, bottom side average, left side average, and right side average; and
determining whether the maximum variance is greater than a maximum preset variance value;
designating for each pixel a fail flag when the maximum variance is determined to be greater than the maximum preset variance value;
designating for each pixel a pass flag when the maximum variance is determined to be less than the maximum preset variance value; and
wherein the circuit is further operable to display an error map of the image after applying the contour algorithm, the error map showing whether respective pixels in the image have a pass or fail operation associated with the pixel.

17. The circuit of claim 14 wherein the circuit is further operable to execute the shape test algorithm on the pixels of the image.

18. The circuit of claim 17 wherein the circuit is further operable to display an error map of the image from the pass and fail operations for each pixel generated by the contour algorithm and from the results of the shape test algorithm.

19. An electronic device including a circuit for extracting shadows in a captured image, the captured image including a plurality of pixels and also including noise, the circuit performing steps comprising:
subdividing the image into a plurality of pixels;
defining a square odd matrix for each pixel, each matrix having a value for the corresponding pixel in the center of the matrix and values for pixels surrounding the pixel in the center;
applying a contour algorithm to each of the defined matrices, the contour algorithm including:
determining averages for the values of the pixels in the first, second, third, and fourth corners of each matrix;
determining averages for the values of the pixels in the top, bottom, left and right sides of the matrix;
determining a maximum variance from the first corner average, second corner average, third corner average, fourth corner average, top side average, bottom side average, left side average, and right side average; and
determining whether the maximum variance is greater than a maximum preset variance value;

designating for each pixel a fail flag when the maximum variance is determined to be greater than the maximum preset variance value designating for each pixel a pass flag when the maximum variance is determined to be less than the maximum preset variance value; and displaying the captured image with values for the pixels adjusted by the designated pass and fail flags.

20. The electronic device of claim 19 wherein the device comprises one of a digital camera, cellular phone, and personal digital assistant.

* * * * *